(12) United States Patent
Inoue et al.

(10) Patent No.: US 6,516,704 B2
(45) Date of Patent: Feb. 11, 2003

(54) BRAKE BOOSTER

(75) Inventors: Hidefumi Inoue, Saitama-Ken (JP); Naohito Saito, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/981,377

(22) Filed: Oct. 17, 2001

(65) Prior Publication Data

US 2002/0056362 A1 May 16, 2002

(30) Foreign Application Priority Data

Nov. 10, 2000 (JP) ........................................ 2000-344338

(51) Int. Cl.$^7$ ................................................ F15B 9/10
(52) U.S. Cl. ..................................................... 91/376 R
(58) Field of Search ............................ 91/376 R, 369.1, 91/369.2, 369.3

(56) References Cited

U.S. PATENT DOCUMENTS 6,065,388 A * 5/2000 Tsubouchi et al. ......... 91/376 R

FOREIGN PATENT DOCUMENTS

| JP | 35474/1998 | 2/1998 |
| JP | 3 070 672 | 5/2000 |

* cited by examiner

*Primary Examiner*—Edward K. Look
*Assistant Examiner*—Thomas E. Lazo
(74) *Attorney, Agent, or Firm*—Flynn, Thiel, Boutell & Tanis, P.C.

(57) ABSTRACT

A tubular member 21 is disposed within a valve body 6, and has a resilient retainer 69 mounted around the outer periphery thereof. The inner periphery of the valve body 6 is formed with an annular groove 68. When a brake pedal is quickly depressed, an input shaft 23 and the tubular member 21 are driven forward through more than a given stroke relative to the valve body, whereby a projection 69a of the retainer 69 becomes engaged with the annular groove 68. This produces and maintains a large opening in an atmosphere valve 32. Accordingly, an output from a tandem brake booster 1 can be increased immediately in response to a quick depression of the brake pedal.

5 Claims, 11 Drawing Sheets

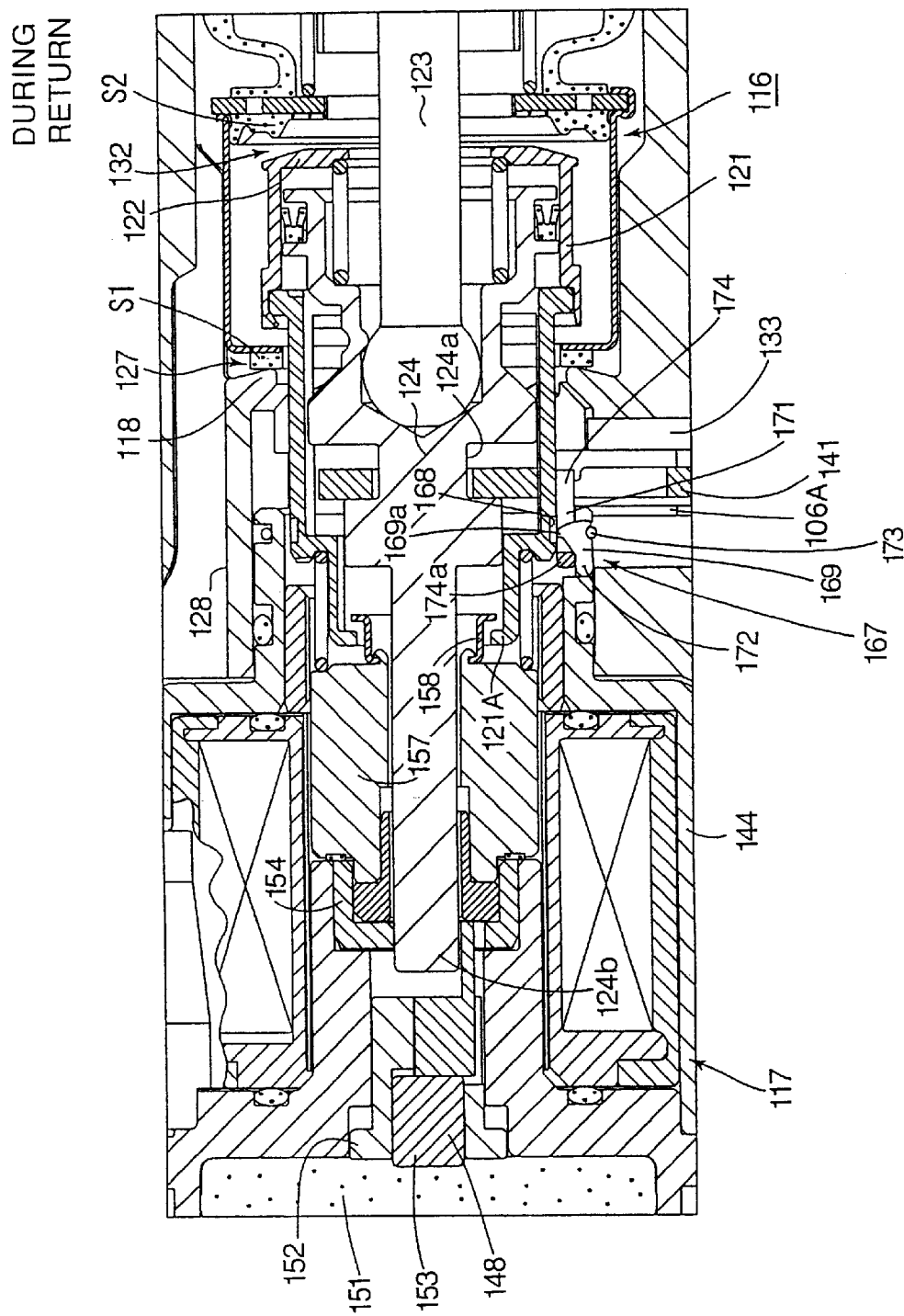

BRAKE BOOSTER

FIELD OF THE INVENTION

The invention relates to a brake booster, and more particularly, to a brake booster which assures that an increased output can be obtained in response to a force of depression of a small magnitude which is applied to an brake pedal in the event a braking effort of an increased magnitude is required as in an emergency brake.

DESCRIPTION OF THE PRIOR ART

A brake booster which is arranged to permit an increased output to be obtained even in response to a brake depressing force of a small magnitude as in an emergency brake which requires a braking effort of an increased magnitude is known in the art, as exemplified by Japanese Patent No. 3,070,672 disclosing a brake booster in which in response to an input which exceeds a given value, an output gradient is increased subsequently to increase the output, or a Japanese Laid-Open Patent Application No. 35,474/1998 disclosing a brake booster in which an operation of an brake pedal is electrically detected, and the output is increased in response thereto.

However, drawbacks are pointed out with conventional brake boosters as mentioned above. Specifically, in the brake booster disclosed in '622 patent, the arrangement is such that the output is increased when the input has exceeded the given value, and accordingly, the output can not be immediately increased in response to a quick depression of the brake pedal.

In the brake booster disclosed in Application No. 35,474/1998, there is a need to provide a solenoid operated valve and a sensor which detects the degree of depression of the brake pedal in an integral manner with the booster, resulting in a complicated arrangement and an increased manufacturing cost of the brake booster.

SUMMARY OF THE INVENTION

In view of the foregoing, it is an object of the invention to provide a brake booster which is simple in construction and which is capable of immediately increasing the output in response to a quick depression of a brake pedal.

Specifically, the invention relates to a brake booster including a valve body slidably disposed within a shell, a power piston mounted on the valve body, a constant pressure chamber disposed forwardly of the power piston within the shell, a variable pressure chamber disposed rearwardly of the power piston within the shell and a valve mechanism for controlling a switching between the supply/discharge of a fluid to and from the variable pressure chamber, the valve mechanism comprising a vacuum valve seat formed on the valve body, a tubular member disposed within the valve body to be axially movable relative to the valve body and having an atmosphere valve seat formed toward the rear end thereof, a valve element having a first seat adapted to be seated on the vacuum valve seat and a second seat adapted to be seated on the atmosphere valve seat, and a valve plunger connected to an input shaft and disposed to be axially movable relative to the valve body so that it is driven forward together with the tubular member when at least the input shaft is driven forward. In accordance with the present invention, there is provided engaging means which connects the tubular member and the valve body together to maintain the second seat of the valve element to be removed from the atmosphere valve seat during the time the input shaft is being driven forward when the input shaft is driven forward relative to the valve body through a given stroke, the engaging means allowing the connection between the tubular member and the valve body to be terminated when the input shaft retracts to its inoperative position.

With the described arrangement, when the brake pedal is quickly depressed and the input shaft is driven forward through the given stroke relative to the valve body, the engaging means maintains the second seat of the valve element removed from the atmosphere valve seat, thereby allowing the atmosphere to be rapidly introduced into the variable pressure chamber of the brake booster to increase its output. In this manner, there is provided a brake booster which is simple in construction and which is capable of immediately increasing the output in response to a quick depression of the brake pedal.

Above and other objects, features and advantages of the invention will become apparent from the following description of the embodiments thereof with reference to the attached drawings.

BRIEF DESCRIPTION OF THE DRAWINGS

FIG. 12 is a cross section illustrating a further phase of operation of the essential part shown in FIG. 8.

DETAILED DESCRIPTION OF THE EMBODIMENTS

Figure 1:
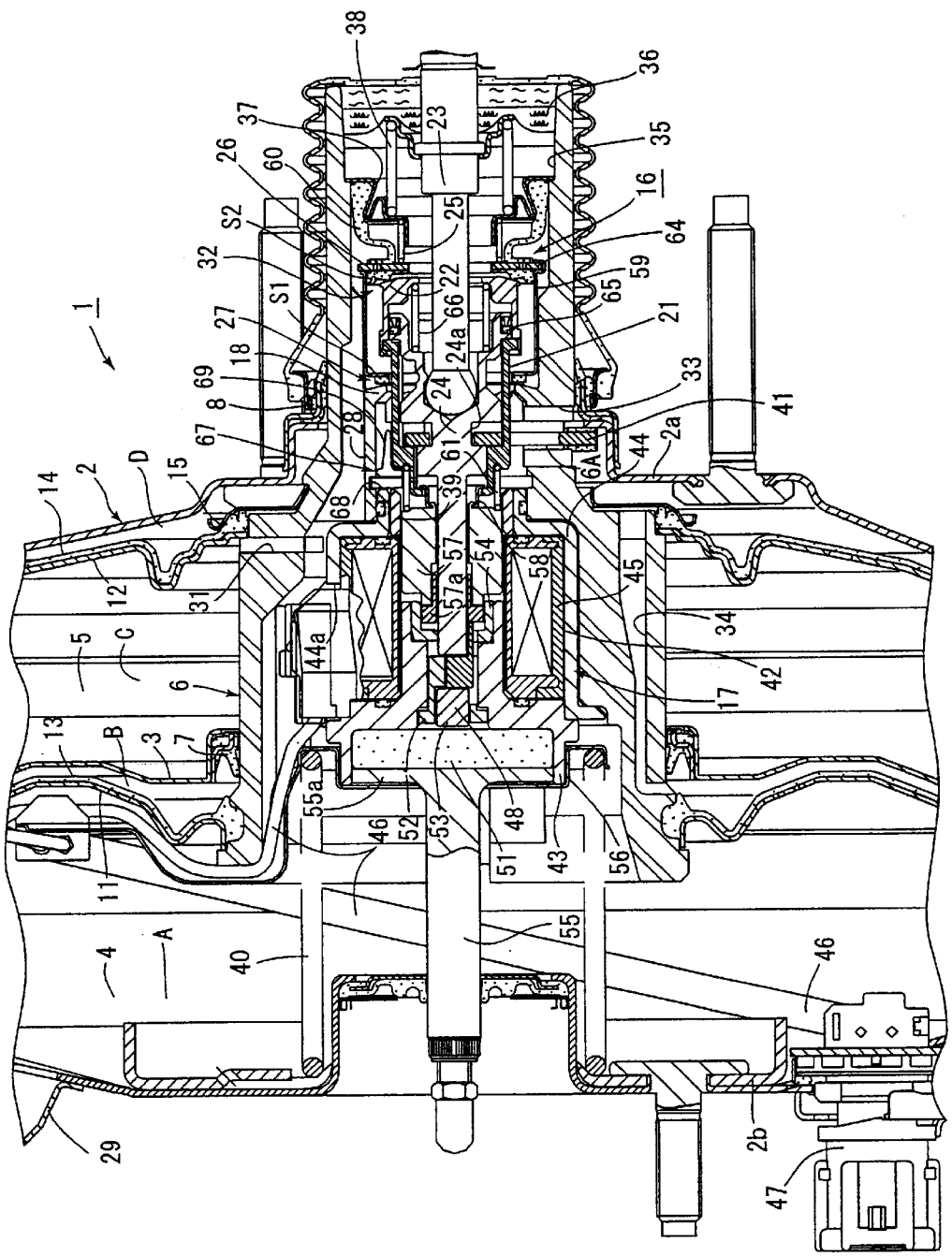
FIG. 1 is a cross section of one embodiment of the present invention.

Referring to the drawings, several embodiments of the invention will now be described. Initially referring to FIGS. 1 and 2, a tandem brake booster 1 has a shell 2, the interior or which is partitioned by a centrally disposed center plate 3 into a forwardly located front chamber 4 and a rearwardly located rear chamber 5. A substantially tubular valve body 6 slidably extends through the inner periphery of the rear portion (right-hand side) of the shell 2 and through the inner periphery of the center plate 3 with hermetic seals being maintained by seal means 7 and 8, respectively.

A front power piston 11 and a rear power piston 12 are connected to the outer periphery of the valve body 6 at locations which are disposed within the front chamber 4 and the rear chamber 5, respectively. A front diaphragm 13 and a rear diaphragm 14 are applied to the back surfaces of the respective power pistons 11 and 12. The inner peripheries of the rear power piston 12 and the rear diaphragm 14 are detented to the outer periphery of the valve body 6 by an annular retainer 15. The front diaphragm 13 partitions the front chamber 4 into a constant pressure chamber A and a variable pressure chamber B while the rear diaphragm 14 partitions the rear chamber 5 into a constant pressure chamber C and a variable pressure chamber D.

A valve mechanism 16 which switches the communication between the constant pressure chambers A, C and the variable pressure chambers B, D is disposed within the valve body 6, and a solenoid 17 is disposed forwardly of the valve mechanism 16.

The valve mechanism 16 comprises an annular vacuum valve seat 18 formed on the inner periphery of the valve body 6, a stepped tubular member 21 which is axially movable relative to the valve body 6, an annular atmosphere valve seat 22 formed on the tubular member 21, a valve plunger 24 in the form of a stepped solid cylinder which is slidably fitted into the tubular member 21 and connected with an input shaft 23, and a valve element 26 which is urged from the rear side by a spring 25 to be seated upon the both valve seats 18 and 22.

A vacuum valve 27 is formed by a combination of the vacuum valve seat 18 and a first seat S1 on the valve element 26 which is disposed for movement into engagement with or disengagement from the valve seat 18. A space located radially outward of the vacuum valve 27 communicates with the constant pressure chamber A through a first constant pressure passage 28 formed in the valve body 6, and the interior of the constant pressure chamber A communicates with the constant pressure chamber C through a second constant pressure passage 31 which continues from the first constant pressure passage 28. The constant pressure chamber A communicates with a source of negative pressure through a tubing 29 which is provided to introduce a negative pressure, whereby a negative pressure is normally introduced into the constant pressure chambers A and C.

An atmosphere valve 32 is formed by a combination of the atmosphere valve seat 22 and a second seat S2 of the valve element 26 which is disposed for movement into engagement with or disengagement from the valve seat 22. A space located between the vacuum valve 27 and the atmosphere valve 32 communicates with the variable pressure chamber D through a radially extending first variable pressure passage 33 formed in the valve body 6, and the variable pressure chamber D communicates with the variable pressure chamber B though an axially extending second variable pressure passage 34 formed in the valve body 6.

A space located radially inward of the atmosphere valve 32 communicates with the atmosphere through an atmosphere passage 35 formed in the valve body 6 and a filter 36 disposed therein.

The rear end of the valve plunger 24 is pivotally connected with the free end of an input shaft 23, and a spring 38 having a greater resilience than the spring 25 is disposed between a retainer 37 which is fitted around the valve body 6 and an annular member mounted on the input shaft 23.

Figure 2:
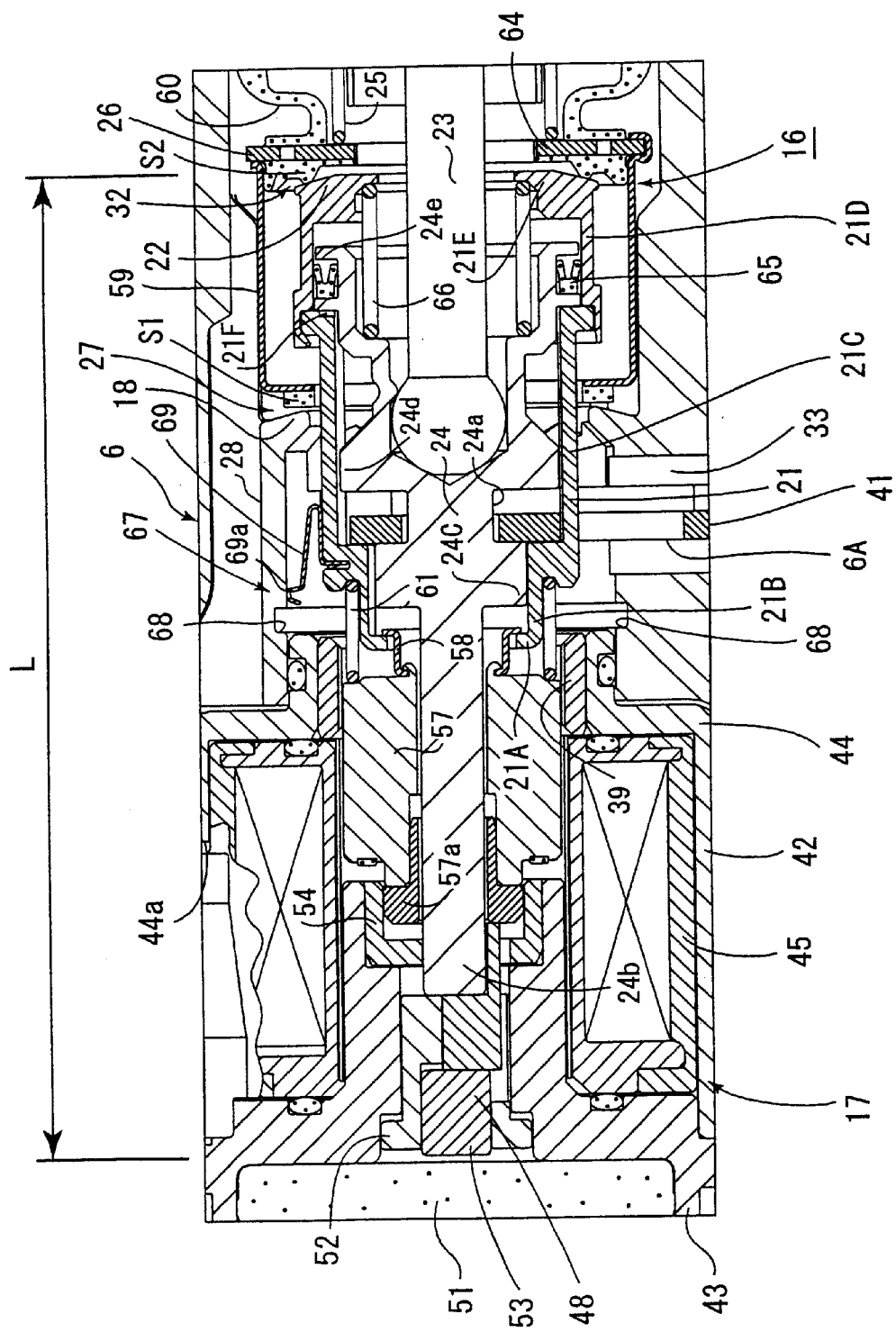
FIG. 2 is an enlarged view of an essential part shown in FIG. 1.

The valve body 6 is normally urged rearward by a return spring 40 disposed in the constant pressure chamber A, and consequently, in the inoperative condition of the tandem brake booster 1 shown in FIGS. 1 and 2, the second seat S2 on the valve element 26 is seated on the atmosphere valve seat 22 to close the atmosphere valve 32 while the first seat S1 of the valve element 26 is removed from the vacuum valve seat 18 to open the vacuum valve 27. It is to be noted that a terminal end of the input shaft 23 is coupled to a brake pedal, not shown. In the inoperative condition, the chambers A, B, C and D communicate with each other, and a negative pressure is introduced into these chambers A, B, C and D.

Toward the axial center, the valve body 6 is formed with a radial opening 6A which continues from the first variable pressure passage 33 and into which a key member 41, which is known in itself, is passed, the key member 41 being engaged with an engaging portion 24a of the valve plunger. The front end face of the radial opening 6A abuts against the key member 41, whereby the valve body 6 is positioned at its inoperative position shown.

The key member 41 and the valve plunger 24 are maintained at advanced positions relative to the valve body 6 by disposing the key member 41 in abutment against a rear wall 2a of the shell 2 when the tandem brake booster 1 shown in FIGS. 1 and 2 assumes its inoperative position. This allows a lost motion of the input shaft 23 to be reduced at the commencement of operation of the tandem brake booster 1.

A housing 42 for the solenoid 17 is fitted into the inner periphery of the valve body 6 while maintaining a hermetic seal, at a location forwardly of the first variable pressure passage 33. The housing 42 comprises a holder 43 in the form of a stepped hollow cylinder 43 which is located forwardly and having an increased diameter at its front end, a yoke 44 in the form of a stepped hollow cylinder which is rearwardly located and having an increased diameter toward the front end, and a sleeve 39 fitted into the inner periphery of the yoke 44 at its rear end.

A cylindrical spool 45 carrying a coil thereon is fitted into an increased diameter opening of the yoke 44 from the front side, and the outer periphery of the holder 43 toward the rear end thereof is fitted into the inner periphery of the spool 45 which is so disposed, thus axially holding the spool 45 sandwiched between the stepped end face of the holder 43, which faces rearward, and the stepped end face of the yoke which faces forward. In this manner, the yoke 44 is fitted into the inner periphery of the valve yoke 6 while maintaining a hermetic seal.

At a give location, the yoke 44 is formed with a notch 44a, where a junction between one end of a lead wire 46 and the coil on the spool 45 is located. An intermediate portion of the lead wire 46 is taken out forwardly through the inner periphery of the valve body 6 toward the front end thereof to be carried by the end face of the front power piston 11. The other end of the lead wire 46 is connected to a connector 47 which is mounted on the front wall 2b of the shell 2.

A reaction transmitting member 48 is disposed in an opening of an reduced diameter which is formed in the rear end of the holder 43, and a reaction disc 51 is received in an opening of an increased diameter which is formed in the front end of the holder 43 at a location forwardly of the reaction transmitting member 48. The reaction transmitting member 48 comprises a tubular member 52 which is slidably fitted into the inner periphery of the holder 43 from the front side, and an axial member 53 including two members which are slidably fitted into the tubular member 52. A substantially cup-shaped stop 54 is fitted into the inner periphery of the holder 43 toward its rear end. The rear end face of the reaction disc 51 is disposed in opposing relationship with the front ends of the tubular member 52 and the axial member 53.

An output shaft 55 is disposed forwardly of the reaction disc 51, and has a base 55a of an increased diameter which is slidably fitted into an opening of an increased diameter in the holder 43, thus abutting against the reaction disc 51 from the front side thereof. In this manner, the reaction disc 51 is held sandwiched between the rear end face of the base 55a and the stepped end face of the holder 43. In the inoperative condition of the tandem brake booster 1 shown in FIGS. 1 and 2, the rear end face of the reaction disc 51 is closely spaced from the end face of the axial member 53 of the reaction transmitting member 48 which opposes thereto.

A dish-shaped retainer 56 is fitted around the outer periphery of the holder 43 at its front end in order to prevent the base 55a of the output shaft 55 from being disengaged from the outer periphery of the holder 43.

The return spring 40 mentioned above is disposed across the retainer 56 and the front wall 2b to maintain the valve body 6 and the like in their inoperative positions shown.

The front end of the output shaft 55 projects externally through the front wall 2b of the shell 2 to be mechanically coupled to a piston of a master cylinder, not shown.

A piston 57 in the form of a hollow cylinder which is formed of a magnetizable material is slidably fitted inside the spool 45 and the sleeve 39 at a location rearward of the reaction transmitting member 48. In the present embodiment, the solenoid 17 is controlled by a controller, not shown. When the solenoid 17 is energized by the controller, the piston 57 is driven forward relative the spool 45, the sleeve 39, the yoke 44, the holder 43 and the valve body 6.

In the present embodiment, the tubular member 21 mentioned above is disposed rearward of the piston 57 in order to mechanically couple the piston 57 and the tubular member 21, and the valve plunger 24 is slidably fitted inside these members.

Toward its front end, the piston 57 is integrally formed with a guide 57a of a small diameter, which is slidably fitted into the stop 54. On the other hand, the piston 57 has a tubular extension which extends axially rearward, with the outer periphery thereof being connected to a front end of a stop 58. In this manner, the piston 57 and the stop 58 are connected together in an integral manner.

The rear end of the stop 58 is formed as a flange which extends radially outward, with a given clearance being maintained between the flange and the rear end face of the piston 57 which is disposed forwardly thereof A radial portion 21A which defines the front end of the tubular member 21 is positioned within the clearance.

Figure 3:
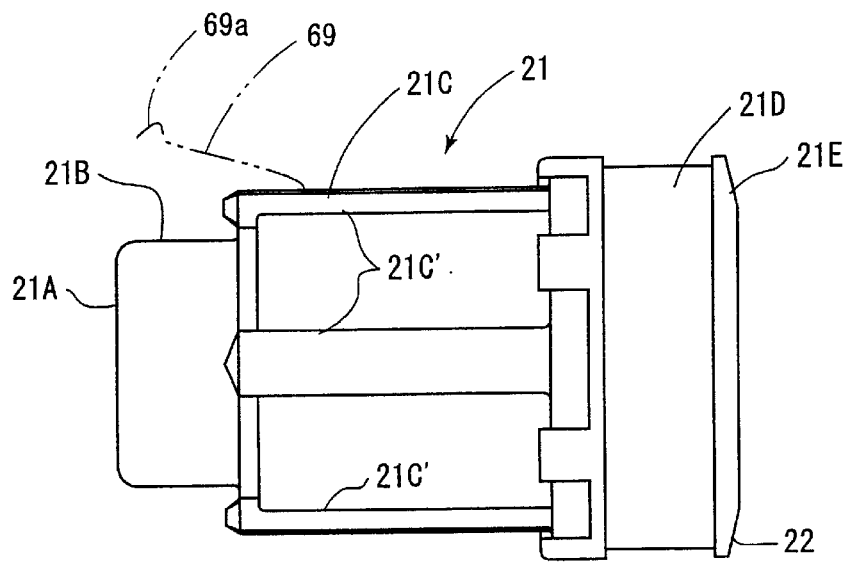
FIG. 3 is a front view of a tubular member 21 shown in FIG. 1.

It will be noted from FIGS. 2 and 3 that the tubular member 21 also comprises a front portion of a reduced diameter 21B, an axially central portion of a medium diameter 21C and a rear portion of an increased diameter 21D. The rear end of the portion 21D is formed with a radial portion 21E which extends radially inward, the rear end face of which defines the atmosphere valve seat 22.

The radial portion 21A and the front portion 21B of a reduced diameter of the tubular member 21 are inserted into the sleeve 39 while the radial portion 21A is slidably fitted around the outer periphery of the stop 58, thereby allowing the front end of the front portion 21B (or the radial portion 21A) to be positioned between the rear end face of the piston 57 and the rear flange of the stop 58.

A spring 61 is disposed between the rear end face of the piston 57 and the opposing stepped end face of the tubular member 21, and thus the piston 57 and the tubular member 21 are urged away from each other (as viewed in the left-and-right direction), causing the radial portion 21A of the tubular member 21 to abut against the flange (rear end) of the stop 58 which is located toward the piston 57. In other words, the radial portion 21A is allowed to move axially between the flange of the stop 58 and the rear end face of the piston 57, thus allowing a relative movement in the axial direction between the piston 57 and the tubular member 21 by a corresponding amount.

As shown in FIG. 3, the portion 21C of a medium diameter is largely notched at four circumferential locations and are accordingly formed by four rectilinear guides 21C' which are spaced apart and which extend axially. The key member 41 is passed radially through the space between the adjacent rectilinear guides 21C'.

Figure 4:
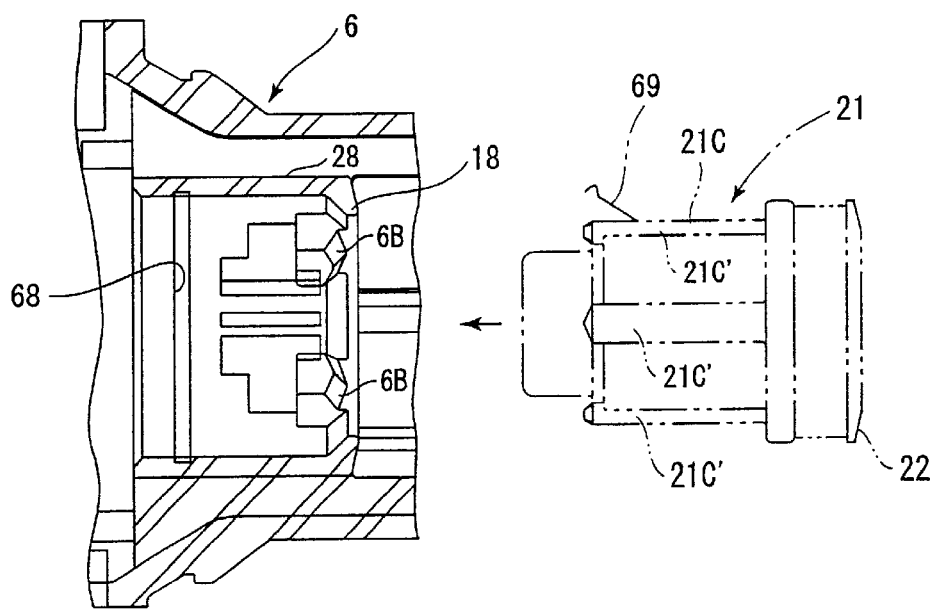
FIG. 4 is a cross section of an essential part of a valve body 6 shown in FIG. 1.

As shown in FIG. 4, the inner periphery of the valve body 6 is formed with a pair of projections 6B for each of four circumferential locations therearound. The four rectilinear guides 21C' of the tubular member 41 are engaged with the projections 6B of each pair formed in the valve body 6 so as to be axially slidable.

As shown in FIG. 2, the valve element 26 comprises a first member 59 which is located forward and which is formed of a rigid body and a second member 60 which is located rearward and which is connected to the first member 59. A ring of rubber is mounted on the front side of the first member 59 to define the first seat S1. The second member 60 is provided with a plate 64 toward its front end, which also comprises a rigid body, and a ring-shaped piece of rubber is applied to the plate 64 to define the second seat S2. In this manner, in the present embodiment, the first seat S1 and the second seat S2 are axially spaced apart, but have an equal diameter. The portion 21D of an increased diameter of the tubular member 21 is positioned between the first seat S1 and second seat S2, and the atmosphere valve seat 22 formed on the tubular member 21 is disposed in opposing relationship with the second seat S2.

Now describing the valve plunger 24, it is to be noted that because the atmosphere valve seat 22 is formed on the tubular member 21 in the present embodiment, the valve plunger 24 of the embodiment is distinct from a usual one in that the valve plunger 24 of the present embodiment is not formed with an atmosphere valve seat 22, but is formed as a stepped round rod having diameters which sequentially decrease toward the front end.

Specifically, the valve plunger 24 has a foremost portion 24b of a reduced diameter, which is followed rearwardly by a portion 24c of a medium diameter, which is in turn followed rearwardly by a rear portion 24d of an increased diameter. The rear end of the rear portion 24d of an increased diameter has its diameter increased to extend radially outward to define a flange 24e.

The foremost portion 24b of the valve plunger 24 extends through the tubular member 21 from the rear side so as to extend through the piston 57 in a slidable manner. It will be noted that the end face of the foremost portion 24b is disposed in abutment against the stepped end faces of the tubular member 52 and the axial member 53. The portion 24c of an medium diameter is slidably fitted into the inner periphery of the portion 21B of a reduced diameter of the tubular member 21; the rear portion 24d of an increased diameter is slidably fitted into the inner periphery of the valve body 6; and finally the flange 24e is slidably fitted into the inner periphery of the portion 21D of an increased diameter of the tubular member 21.

A seal member 65 is mounted on the outer periphery of the flange 24e, thus maintaining a hermetic seal between the flange 24e and the inner periphery of the portion 21D of an increased diameter of the tubular member 21.

Toward the rear end, the outer periphery of the portion 24c of a medium diameter is formed with an annular groove, which defines an engaging portion 24a that is engaged by the key member 41. As mentioned above, the portion 21C of a medium diameter of the tubular member 21 is notched at selected locations to allow the key member 41 to pass radially therethrough to be engaged with the engaging portion 24a. The rear end of the valve plunger 24 is pivotally connected with the input shaft 23, as previously mentioned.

A spring 66 is disposed between the rear end of the valve plunger 24 and the radial portion 21E of the tubular member 21 which opposes thereto. In this manner, the tubular member 21 is normally urged rearward relative to the valve plunger 24 to a position where the flange 24e abuts against the stepped end face 21F of the tubular member 21 and where the front end face of the valve plunger 24 (or the front end face of the portion 24b of a reduced diameter) abuts against the rear end face of the tubular member 52 and the stepped end face of the axial member 53 of the reaction transmitting member 48.

In the present embodiment, engaging means 67 is provided across the inner periphery of the valve body 6 and the tubular member 21. The engaging member 67 connects the tubular member 21 and the valve body 6 together to maintain the atmosphere valve 32 widely open when the brake pedal is quickly depressed to drive the input shaft 23 forward through a give stroke relative to the valve body 6, for example.

The engaging means 67 comprises an annular groove 68 which is provided as a recess formed in the inner peripheral surface of the valve body 6, and a metal retainer 69 serving as a convex resilient member mounted around the outer periphery of the tubular member 21 (see FIGS. 2 and 3).

The recess or annular groove 68 is formed at a location forward of the first radial passage 33 formed in the inner periphery of the valve body 6 while the retainer 69 is substantially in the form of V shaped, with a fold positioned rearward. One of the free ends which is located inward is connected to the outer periphery of the portion 21C of a medium diameter of the tubular member 21 toward the front end to urge a rear portion thereof which is located adjacent to the free end into tight contact with the outer peripheral surface of the tubular member 21. The other or outer free end of the retainer 69 forms a projection 69a which is chevron-shaped in section.

The retainer 69 has a resilience, and accordingly, the projection 69a is urged radially outward of the valve body 6. As a consequence, in the inoperative condition of the tandem brake booster 1 shown in FIGS. 1 and 2, the projection 69a of the retainer 69 presses against the inner peripheral surface of the valve body 6 at a location rearward of the annular groove 68. However, when the tubular member 21 is driven forward relative to the valve body 6, the projection 69a of the retainer 69 axially slides along the inner peripheral surface of the valve body 6 at a location rearward of the annular groove 68.

When the brake pedal is quickly depressed and the input shaft 23, the valve plunger 24 and the tubular member 21 are driven forward axially through a given stroke relative to the valve body 6, the projection 69a of the retainer 69 is engaged with the annular groove 68. This means that the valve body 6 and the tubular member 21 are connected together through the retainer 69 (see FIG. 5). When the tubular member 21 and the valve body 6 are connected together through the retainer, the atmosphere valve seat 22 on the tubular member 21 is maintained at a position which is forwardly spaced by a given distance from the second seat S2 on the valve element 26, whereby the atmosphere valve 32 is maintained in its widely opened condition. This allows the atmosphere to be introduced rapidly into the variable pressure chambers B and D, allowing the output from the tandem brake booster 1 to be increased immediately in response to the quick depressing operation of the brake pedal.

Figure 7:
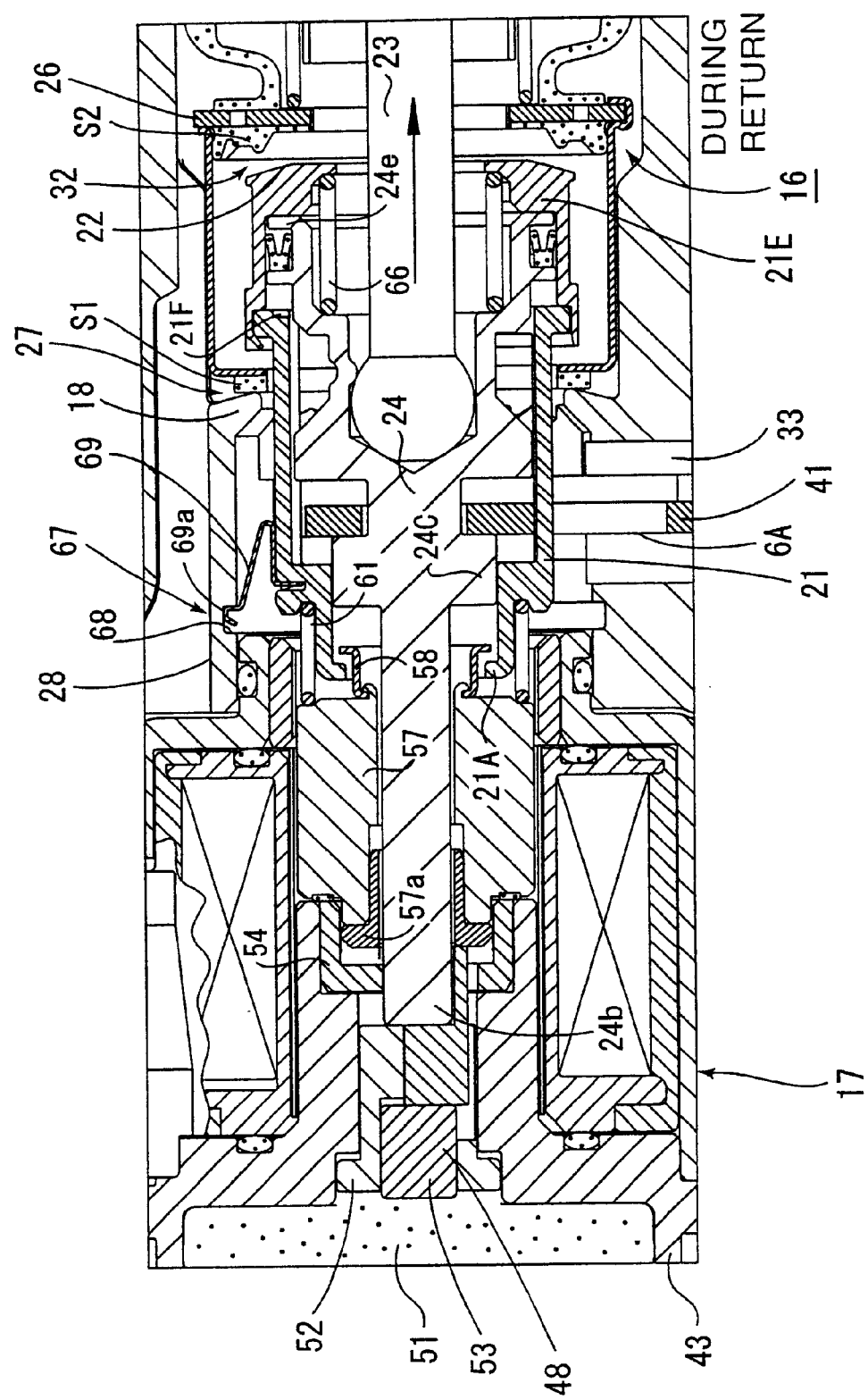
FIG. 7 is a cross section illustrating a further phase of operation of the essential part shown in FIG. 1.

When the brake pedal is released from depression after the tubular member 21 and the valve body 6 have once been connected together through the retainer 69 acting as a convex resilience member, the input shaft 23 and the valve plunger 24 initially retract toward their inoperative positions, followed by the abutment of the flange 24e of the valve plunger 24 against the flange 21E of the tubular member 21, thus urging the tubular member 21 to move also toward its inoperative position (see FIG. 7). When the tubular member 21 retracts rearward relative to the valve body 6 in this manner, the retainer 69 is compressed in the radial direction, whereby the projection 69a of the retainer 69 is disengaged from the annular groove 68 to be pressed against the inner peripheral surface which is located rearward of the annular groove 68. Thus, a movement of the tubular member 21 as it is urged rearward relative to the valve body from a condition in which the projection 69a of the retainer 69 is engaged with the annular groove 6 terminates the connection between the valve body 6 and the tubular member 21 through the retainer 69.

Thus, in the present embodiment, by providing the engaging means 67 at a location adjacent to the valve mechanism 16, a rapid increase in the output is allowed in response to a quick depression of the brake pedal, for example.

Operation

In the inoperative condition shown in FIGS. 1 and 2 in which the solenoid 17 is not energized and a brake pedal, not shown, is not depressed, the valve plunger 24 is engaged with the key member 41 which is in abutment against the wall 2a of the shell 2 and is maintained in its inoperative position shown. The tubular member 21 and the valve body 6 also abut against the key member 41 and assume inoperative positions shown.

The flange 24e of the valve plunger 24 abuts against the stepped end face 21F of the tubular member 21, and the front end face of the valve plunger 24 (or the end face of the portion 24b of a reduced diameter) abuts against the axial member 53 and the tubular member 52 of the reaction transmitting member 48. The atmosphere valve seat 22 which is formed on the tubular member 21 is engaged with the second seat S2 of the valve element 26 to close the atmosphere valve 32 while the first seat S1 of the valve element 26 is removed from the vacuum valve seat 18 to open the vacuum valve 27. The projection 69a of the retainer 69 is removed from the annular groove 68 and presses against the inner peripheral surface of the valve body 6 at a location rearward of the annular groove.

The piston 57 is positioned at its retracted end which is rearward of the housing 42 while the front end face of the piston 57 (or the end face of the guide 57a) is spaced from the end face of the stop 54.

A close clearance is maintained between the front end face of the reaction transmitting member 48 (the end face of the axial member 53) and the rear end face of the reaction disc 51. Because the vacuum valve 27 is open while the atmosphere valve 32 is closed, the chambers A, B, C and D communicate with each other and a negative pressure is introduced into all of these chambers.

During a Gentle Depression of a Brake Pedal

When a brake pedal, not shown, is gently depressed under the inoperative condition, the input shaft 23, the valve plunger 24 and the tubular member 21 are gently driven forward in an integral manner.

Accordingly, the first seat S1 of the valve element 26 is seated upon the vacuum valve seat 18 to close the vacuum valve 27 while the second seat S2 of the valve element 26 becomes removed from the atmosphere valve seat 22 to open the atmosphere valve 32. Accordingly, a communication between the both constant pressure chambers A, C and the both variable pressure chambers B, D is interrupted, introducing the atmosphere into the both variable pressure chambers B and D. A pressure differential between the negative pressure in the both constant pressure chambers A, C and the atmospheric pressure in the both variable pressure chambers B, D drives the both power pistons 11, 12 and the valve body 6 and other members forwardly.

During the gentle depression of the brake pedal, the retainer 69 initially moves forward relative to the valve body 6 until the first seat S1 of the valve element 26 becomes seated upon the vacuum valve seat 18 and the atmosphere valve seat 22 moves away from the second seat S2, but subsequently, the pressure differential mentioned above causes the valve body 6 to be also driven forward in following relationship with the retainer because the forward stroke of the input shaft 23, the valve plunger 24 and the tubular member 21 relative to the valve body 6 does not reach a given stroke, and accordingly, the projection 69a of the retainer 69 cannot engage the annular groove 68. Consequently, the connection of the tubular member 21 and the valve body 6 through the retainer 69 cannot occur.

It is to be noted that as the tubular member 21 is driven forward as mentioned above, it also moves slightly forward relative to the piston 57, but the radial portion 21A of the tubular member 21 does not abut against the rear end face of the piston 57, but is located between this end face and the rear end (flange) of the stop 58. In this manner, an arrangement is made such that if the valve plunger 24 is driven forward, this cannot cause a forward movement of the piston 57.

The tandem brake booster 1 is actuated in this manner. A reaction from the output acting upon the output shaft 55 causes an axial portion of the reaction disc 51 to bulge rearward to abut against the axial member 53 of the reaction transmitting member 48. Consequently, from this point in time, the reaction to the output which acts on the output shaft 55 is transmitted to a driver through the valve plunger 24, the input shaft 23 and the brake pedal. In this manner, during a gentle depression of a brake pedal which occurs normally, the valve mechanism 16 is controlled in a manner such that the input applied to the input shaft 23 is balanced with the reaction from the reaction disc 51, allowing the output to increase at a given servo ratio in the similar manner as in the conventional brake booster.

If the driver now releases the brake pedal, the input shaft 23, the valve plunger 24 and the tubular member 21 retract, the atmosphere valve seat 22 is engaged with the second seat S2 of the valve element 26 to close the atmosphere valve 32, and the first seat S1 becomes removed from the vacuum valve seat 18 to open the vacuum valve. Accordingly, the atmosphere is displaced from the variable pressure chambers B and D through the constant pressure chambers A and C, thus resuming the negative pressure. Accordingly, an output from the brake booster decreases and the return spring 40 causes the valve body 6 and the like to retract to their inoperative positions shown in FIG. 1.

The normal operation of the tandem brake booster 1 which occurs when the brake pedal is gently depressed takes place in the manner mentioned above. In other words, unless the solenoid 17 is energized, the tubular member 21 is adapted to move back and forth in an integral manner with the valve plunger 24 and the input shaft 23. Also, when the brake pedal is gently depressed, the projection 69a of the retainer 69 does not engage the annular groove 68. Thus, the engaging means 67 is prevented from functioning.

During a Quick Depression of a Brake Pedal

Figure 5:
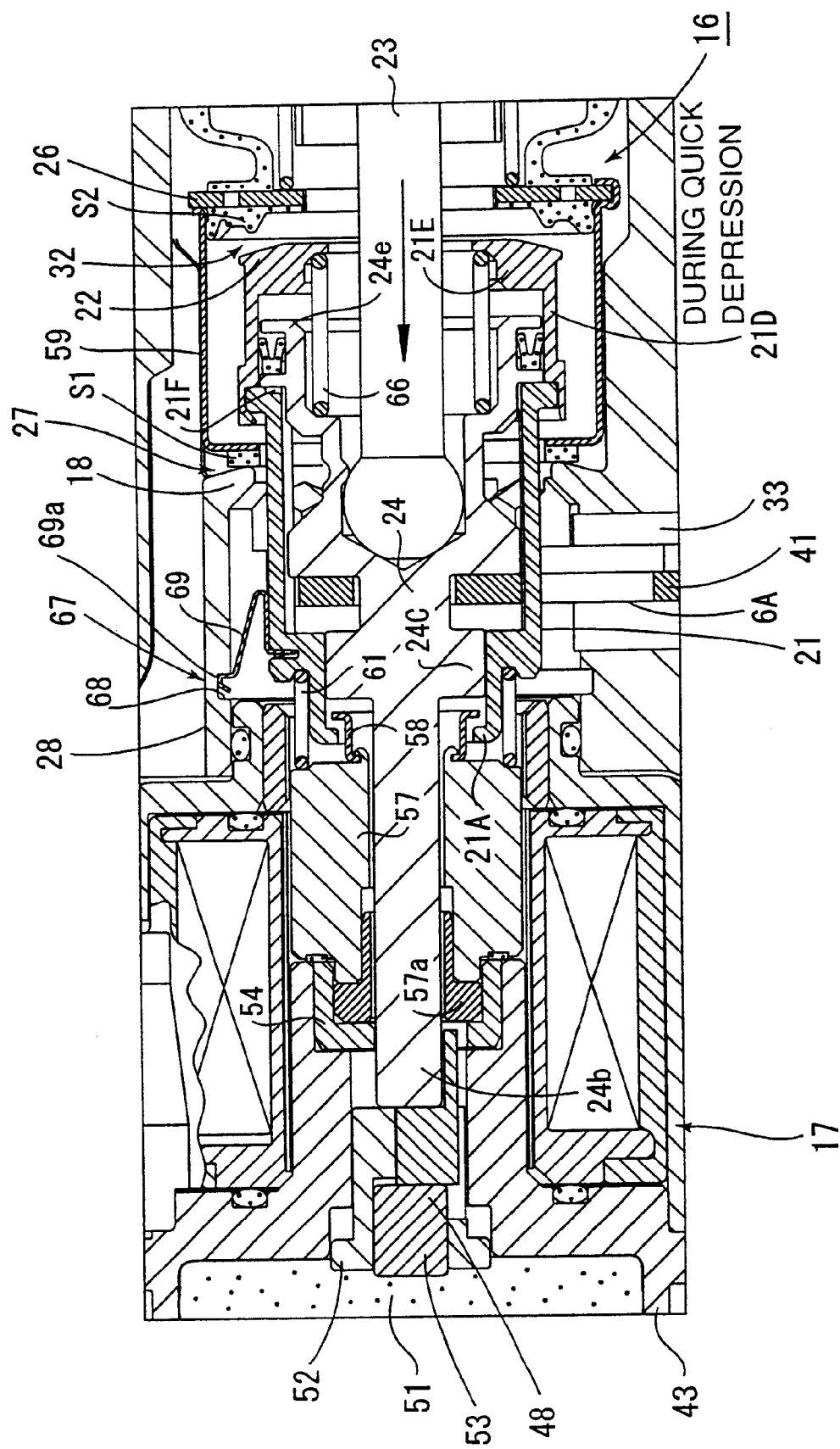
FIG. 5 is a cross section illustrating a phase of operation of the essential part shown in FIG. 1.

When the brake pedal is quickly depressed under the inoperative condition shown in FIGS. 1 and 2, the input shaft 23, the valve plunger 24 and the tubular member 21 are quickly driven forward in an integral manner (see FIG. 5).

When the input shaft 23, the valve plunger 24 and the tubular member 21 are quickly driven forward, and the vacuum valve 27 is closed while the atmosphere valve 32 is opened, there is a time lag in the introduction of the atmosphere into the variable pressure chambers B, D with respect to the rapid forward movement of the input shaft 23 and the like. Accordingly, there is a lag in the forward movement of the valve body 6, and as a consequence, the input shaft 23, the valve plunger 24 and the retainer 69 are driven forward with a relatively large offset from the valve body 6 as compared with the offset which occurs during the normal gentle depression of the brake pedal. In other words, the input shaft 23, the valve plunger 24 and the retainer 69 are driven forward more than the given stroke relative to the valve body 6, whereby the projection 69a of the retainer 69 becomes engaged with the annular groove 68 to connect the valve body 6 and the tubular member 21 together.

In response thereto, the second seat S2 of the valve element 26 becomes removed from the atmosphere valve seat 22 to open the atmosphere valve 32 with a larger valve opening which is subsequently maintained, while the first seat S1 of the valve element 26 is seated upon the vacuum valve seat 18 to close the vacuum valve 27.

Accordingly, the communication between the both constant pressure chambers A, C and the both variable pressure chambers B, D is interrupted, and the atmosphere is rapidly introduced into the both variable pressure chambers B and D. The pressure differential between the negative pressure in the both constant pressure chambers A, C and the atmospheric pressure in the both variable pressure chambers B, D drives the both power pistons 11, 12 and the valve body 6 and the like forward.

During the quick depression of the brake pedal, the valve opening of the atmosphere valve 32 is maintained large enough to allow the atmosphere to be rapidly introduced into the variable pressure chambers B and D, thus increasing the output from the tandem brake booster.

Figure 6:
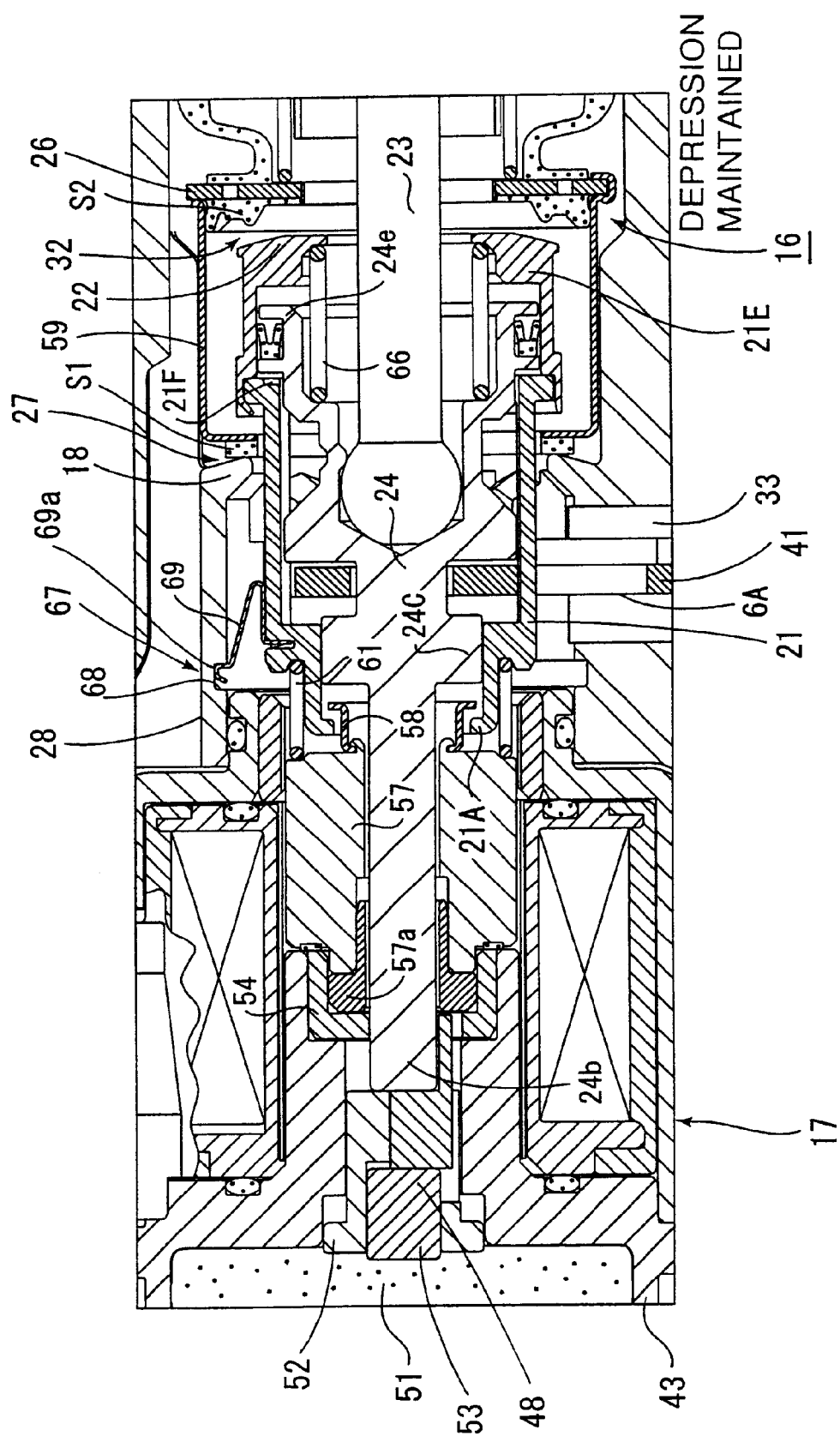
FIG. 6 is a cross section illustrating another phase of operation of the essential part shown in FIG. 1.

When the tandem brake booster 1 is actuated in this manner, the reaction disc 51 abuts against the axial member 53 and the tubular member 52 as shown in FIG. 6 and the brake reaction acting upon the output shaft 55 is transmitted to the input shaft 23 through the axial member 53, the tubular member 52 and the valve plunger 24. Concomitantly, the valve plunger 24 is moved slightly rearward relative to the tubular member 21 and the valve body 6. However, because the clearance is maintained between the rear end face of the flange 24e of the valve plunger 24 and the opposing radial portion 21E of the tubular member 21, the atmosphere valve 32 maintains its large valve opening as long as the input shaft 23 is driven forward. Accordingly, if the input applied to the input shaft 23 is not so large, an output of an increased magnitude can be obtained.

When a brake pedal is subsequently released, the input shaft 23 and the valve plunger 24 retract rearward, as shown in FIG. 7. Concomitantly, the rear end face of the flange 24e of the valve plunger 24 abuts against the opposing radial portion 21E of the tubular member 21, whereby the tubular member 21 retracts also in an integral manner with the valve plunger 24. Concomitantly, the projection 69a of the retainer 69 is disengaged from the annular groove 68 to terminate the connection between the valve body 6 and the tubular member 21, thus allowing the various members of the tandem brake booster 1 to return to their inoperative positions shown in FIGS. 1 and 2.

Operation as an Automatic Brake

When it is desired to operate the tandem brake booster 1 as an automatic brake, the controller mentioned previously is used to energize the solenoid 17 under the inoperative condition shown in FIG. 2 without depressing the brake pedal.

This causes the piston 57 to move forward relative to the hosing 42, and simultaneously the tubular member 21 moves forward slowly relative to the valve body 6 and the valve plunger 24.

As a consequence, the second seat S2 of the valve element 26 becomes disengaged from the atmosphere valve seat 22 to open the atmosphere valve 32 while the first seat S1 of the valve element 26 is seated upon the vacuum valve seat 18 to close the vacuum valve 27. Accordingly, the atmosphere is introduced into the both variable pressure chambers B and D, driving the both power pistons 11 and 12 and the valve body 6 and the like forward. The tandem brake booster 1 is thus actuated as an automatic brake.

At the commencement of operation as an automatic brake, the axial member 53 is pushed in response to the action of the piston 57 to abut against the reaction disc 51, but because the axial member 53 is spaced from the front end face of the valve plunger 24, the brake reaction which is acting on the output shaft 55 is not transmitted through the valve plunger 24 and the input shaft 23. Subsequently, as the brake reaction which is acting upon the output shaft 55 increases, the reaction disc 51 bulges rearward to push the axial member 53 rearward.

When the solenoid 17 ceases to be energized after the automatic brake has been once actuated, the spring 66 pushes the tubular member 21 and the piston 57 rearward relative to the valve plunger 24, whereby the atmosphere valve 32 is closed and the vacuum valve 27 is opened. Accordingly, the valve body 6 and the like return to their original inoperative positions shown in FIG. 1.

In the first embodiment mentioned above, the annular groove 68 serving as a recess formed in the inner periphery of the valve body 6 and the retainer 69 acting as a convex resilient member mounted on the tubular member 21 constitute together the engaging means 68. However, the annular groove 68 and the retainer 69 may be reversed in disposition. Thus, the retainer 69 acting as a convex resilient member may be provided on the inner periphery of the valve body 6 while the annular groove 68 serving as the recess may be formed in the outer periphery of the tubular member 21. Again, a similar functioning can be achieved as in the first embodiment.

Second Embodiment

Figure 8:
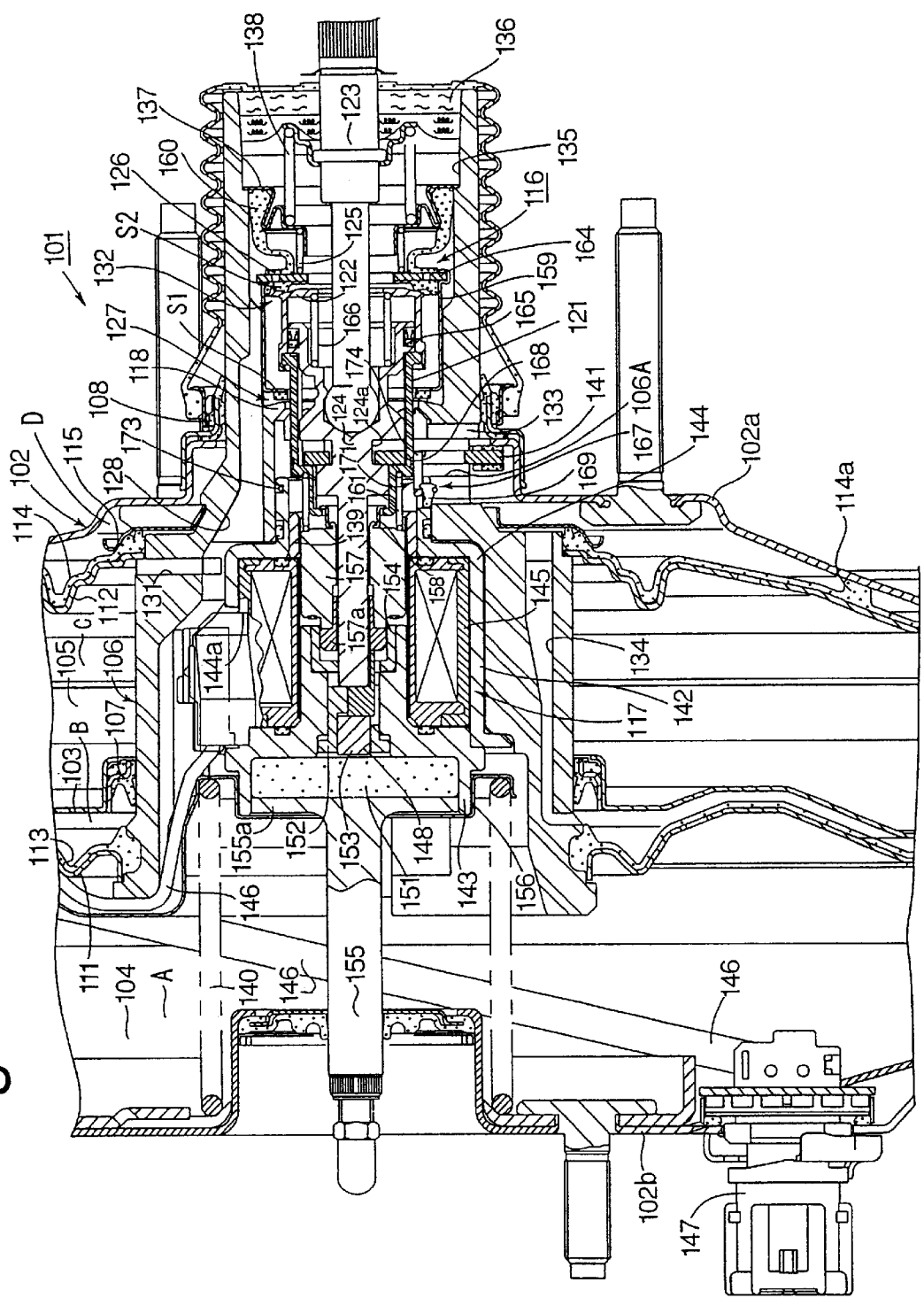
FIG. 8 is a cross section of a second embodiment of the present invention.
Figure 9:
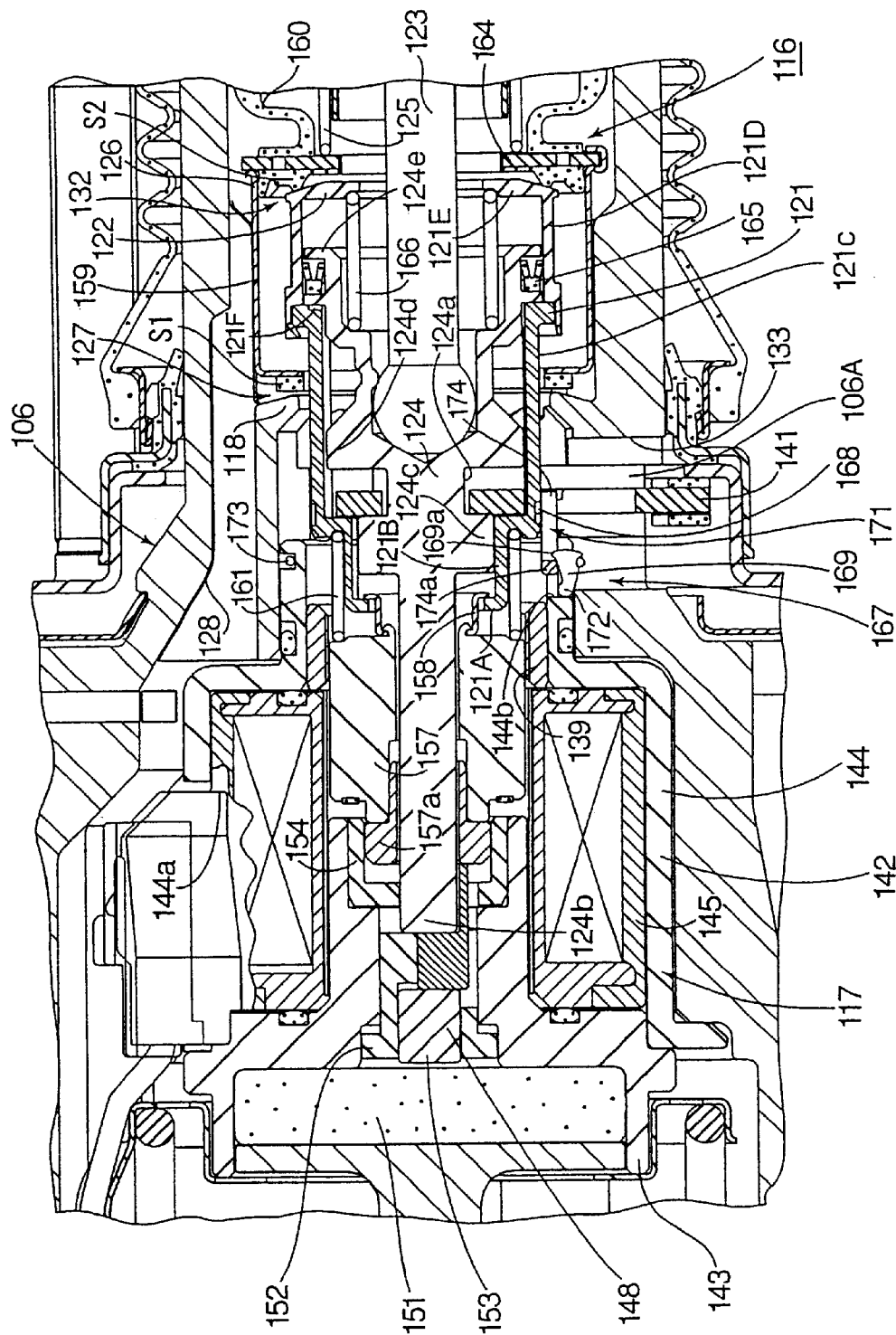
FIG. 9 is an enlarged view of an essential part shown in FIG. 8.

FIGS. 8 and 9 show a second embodiment of engaging means 167. In the second embodiment, engaging means 167 comprises a recess 168 formed in a tubular member 121, an engaging member 169 formed on a valve body 106, and drive means 171 which causes the engaging member 169 to be engaged with or disengaged from the recess 168.

Specifically, the recess 168 comprises an annular groove which is formed circumferentially in the outer peripheral surface of a portion 121C of a medium diameter of a tubular member 121 toward the front end thereof.

A yoke 144 has a rear portion of a reduced diameter, the axial size of which is increased and which is formed with a notch 144b at its rear end.

The engaging member 169, which is substantially triangular, is mounted in the notch 144b by a pin 172. Toward the rear end, the engaging member 169 is formed with a pawl 169a on its inner portion. The engaging member 169 is swingable radially of the yoke 144 (or vertically as viewed in the drawings) about the pin 172 as the fulcrum.

Around the outer periphery, the yoke 144 is formed with an annular groove, in which a C-shaped spring 173 (acting as an resilient member) is mounted, the spring 173 abutting against a rear outer portion of the engaging member 169 from the outside. In this manner, the pawl 169a of the engaging member 169 is normally urged radially inward, or in a direction to be engageable with the recess 168. It is to be noted that while the spring 173 is formed of a metal, the spring 173 may be replaced by a rubber O-ring which is fitted in the annular groove around the yoke 144 to urge the pawl 169a of the engaging member 169 radially inward.

Drive means 171 comprises a key member 141, and an operating member 174 which is connected to the key member 141. The operating member 174 is U-shaped, the both free ends of which are disposed rearward to be connected to the key member 141. In this manner, the operating member 174 is held around the outer peripheral surface of a portion 121C of a medium diameter of the tubular member 121 while being disposed to be orthogonal to the recess 168. The operating member 174 has a forward fold 174a, which is inserted into a notch 144b in the yoke 144 from the rear side to be in contact with a portion of the engaging member 169 which is disposed forwardly of the pawl 169a.

In the inoperative condition of a tandem brake booster 101 shown in FIGS. 8 and 9, the pawl 169a of the engaging member 169 is in abutment against the fold 174a of the operating member 174.

In the present embodiment, a radial opening 106A in a valve body 106 through which the key member 141 is passed has an axial size (or the size in the left-and-right direction as viewed in the drawing) which is enlarged to the order of three times the thickness of the key member 141. As shown in FIG. 8, at a plurality of circumferential locations around the outer periphery of a rear diaphragm 114, projections 114a are formed to define stops. In the inoperative condition of the tandem brake booster 101 shown in FIGS. 8 and 9, a return spring 140 urges the valve body 106 rearward, and the valve body remains stationary at a position where the projections 114a on the rear diaphragm 114 abut against a rear wall 102a of a shell 102. On the other hand, the key member 141 also remains stationary at its inoperative position shown where it abuts against the rear wall 102a of the shell 102, but a clearance which is sized comaparable to the thickness of the key member 141 is maintained between the key member 141 and the front end face of the radial opening 106A in which the key member is inserted. As mentioned previously, the pawl 169a of the engaging member 169 is engaged with the fold 174a of the operating member 174 which is connected to the key member 141 at this time, and accordingly, the pawl 169a of the engaging member 169 is kept radially outward so as to avoid an engagement with the recess 168.

In other respects, the second embodiment is similar to the first embodiment, and therefore will not be described in further detail. It is to be understood that in the description of the second embodiment, the parts corresponding to those shown in the first embodiment are designated by like reference numerals as used in the first embodiment, to which 100 is added.

Operation of Second Embodiment

In the second embodiment constructed in the manner mentioned above, in the inoperative condition shown in FIGS. 8 and 9, the projections 114a on the rear diaphragm 114 abut against the rear wall 102a of the shell 102 and the key member 141 also abuts against the rear wall 102a of the shell 102. A clearance comparable to the thickness of the key member 141 is maintained between the key member 141 and the front end face of the radial opening 106A. A front end face of an engaging portion 124a of a valve plunger 124 abuts against the key member 141, and a tubular member 121 also abuts against the key member 141.

The fold 174a of the operating member 174 abuts against the pawl 169a of the engaging member 169, and accordingly, the pawl 169a is maintained at a position where it cannot engage the recess 168 disposed outward (or below, as viewed in the drawing) of the outer peripheral surface of the portion 121C of a medium diameter of the tubular member 121. The recess 168 in the tubular member 121 is disposed at the same axial position as the key member 141.

Operation During a Usual Gentle Depression of Brake Pedal

When a brake pedal, not shown, is gently depressed under the inoperative condition mentioned above, an input shaft 123, a valve plunger 124 and the tubular member 121 are gently driven forward in an integral manner. As the valve plunger 124 is driven forward, the rear end face of the engaging portion 124a of the valve plunger 124 abuts against the key member 141, and subsequently, the input shaft 123, the valve plunger 124, the tubular member 121 and the key member 141 are gently driven forward in an integral manner.

Accordingly, a first seat S1 of a valve element 126 becomes seated upon a vacuum valve seat 118 to close a vacuum 127 while an atmosphere valve seat 122 moves away from a second seat S2 of the valve element 126 to open an atmosphere valve 132. Accordingly, a communication between both constant pressure chambers A, C and both variable pressure chambers B, D is interrupted, and the atmosphere is introduced into the both variable pressure chambers B and D. A pressure differential between the negative pressure in the both constant pressure chambers A, C and the atmospheric pressure in the both variable pressure chambers B, D drive both power pistons 111, 112 and the valve body 106 and the like forward. However, because the stroke by which the operating member 174 is advanced relative to the valve body 106 is small, the pawl 169a cannot engage the recess 168 in the tubular member 121. Accordingly, the tubular member 121 and the valve body 106 cannot be connected together by the engaging member 169.

When the tubular member 121 is driven forward in the manner mentioned above, the tubular member 121 undergoes a slight relative movement forwardly with respect to the piston 157, but the radial portion 121A of the tubular member 121 does not abut against the rear end face of the piston 157, but is located between this end face and the rear end (or flange) of a stop 158. In this manner, if the valve plunger 124 is driven forward, the piston 157 cannot be driven forward in response thereto.

The tandem brake booster 101 is actuated in this manner. A reaction for the output acting upon an output shaft 155 causes an axial portion of a reaction disc 151 to bulge rearward, causing the latter to abut against an axial member 153 of a reaction transmitting member 148. Accordingly, from this point in time on, a reaction for the output which is acting upon the output shaft 155 is transmitted to a driver through the valve plunger 124, the input shaft 123 and the brake pedal.

In the operative condition where the input shaft 123 is driven forward, the output increases at a given servo ratio in the similar manner as in a conventional brake booster.

If the driver now releases the brake pedal, the input shaft 123, the valve plunger 124 and the tubular member 121 retract, an atmosphere valve seat 122 becomes seated upon the second seat S2 of the valve element 126 to close an atmosphere valve 132 and the first seat S1 moves away from a vacuum valve seat 118 to open a vacuum valve 127. Accordingly, the atmosphere is displaced from the variable pressure chambers B and D through the constant pressure chambers A and C, thus resuming the negative pressure. Consequently, the output from the brake booster 101 decreases, and a return spring 140 causes the valve body 106 and the like to retract to their inoperative positions shown in FIGS. 8 and 9. This covers the operation of a tandem brake booster 101 when the brake pedal is gently depressed.

During Quick Depression of Brake Pedal

When the brake pedal is quickly depressed under the inoperative condition, the input shaft 123, the valve plunger 124 and the tubular member 121 are driven forward initially and rapidly, and substantially at the same time, the rear end face of the engaging portion 124a of the valve plunger 124 abuts against the key member 141 from the rear side, whereby the input shaft 123, the valve plunger 124, the tubular member 121 and the key member 141 are driven forward. Because there occurs a time lag in the introduction of the atmosphere into the variable pressure chambers B, D with respect to the quick forward movement of the input shaft 123 and the like even though the vacuum valve 127 is closed and the atmosphere valve 132 is opened, there is a lag in the forward movement of the valve body 106, whereby the input shaft 123, the valve plunger 124, the tubular member 121 and the key member 141 are advanced lagely relative to the valve body 106. When the stroke exceeds a given stoke, the fold 174a of the operating member 174 moves away from the pawl 169a of the engaging member 169, whereby the pawl 169a of the engaging member 169 which is urged by a spring 173 oscillates inward through the gap between the free ends of the operating member 174 to be engaged with the recess 168 in the tubular member 121. This means that the tubular member 121 and the valve body 106 are connected together by the engaging member 169.

Figure 10:
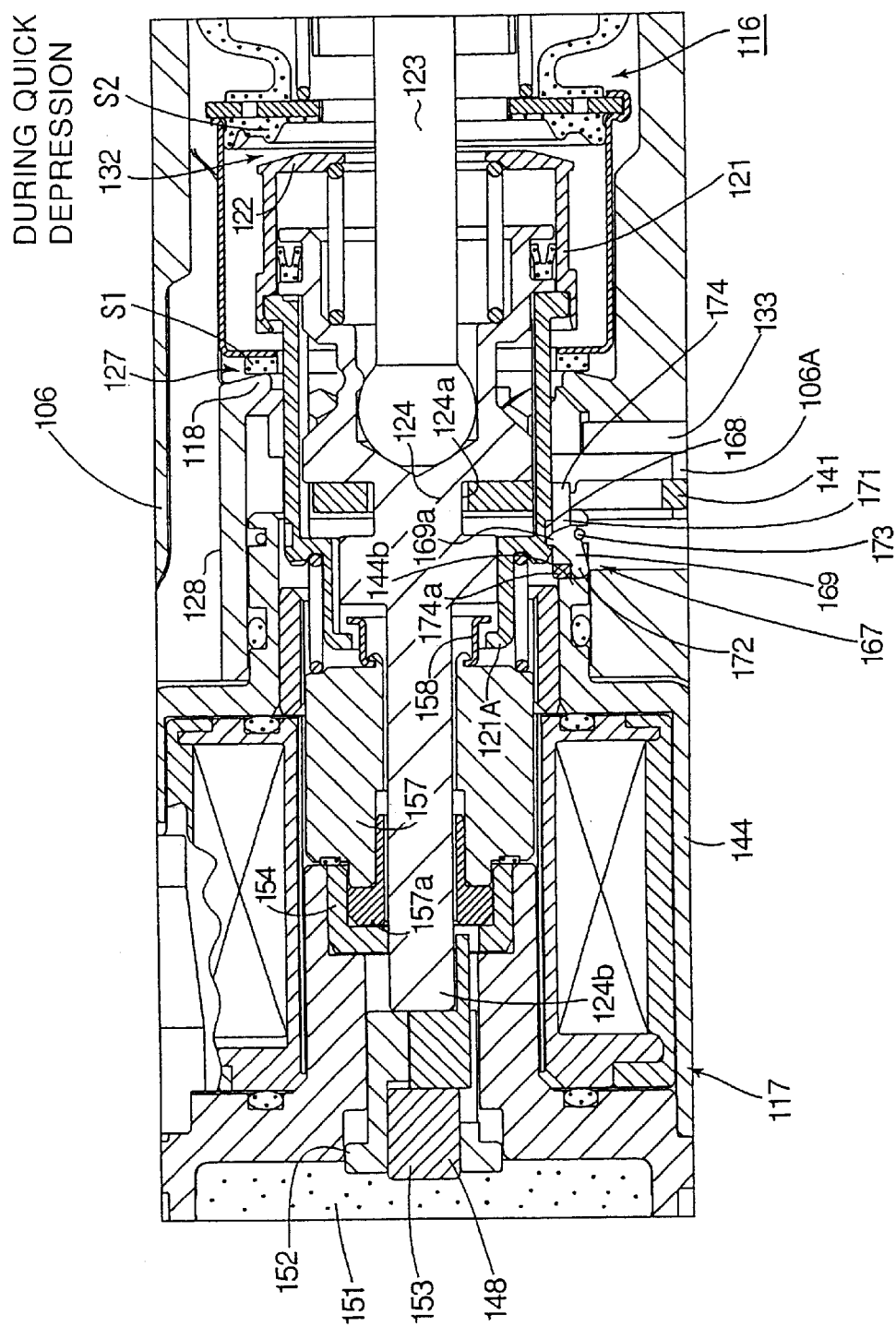
FIG. 10 is a cross section illustrating a phase of operation of the essential part shown in FIG. 8.

As a consequence, the atmosphere valve 132 is maintained open with an increased valve opening while the vacuum valve 127 is closed, allowing the tandem brake booster 101 to produce an increased output rapidly (FIG. 10). Accordingly, when the brake pedal is quickly depressed, an increased output can be immediately obtained in response thereto.

Figure 11:
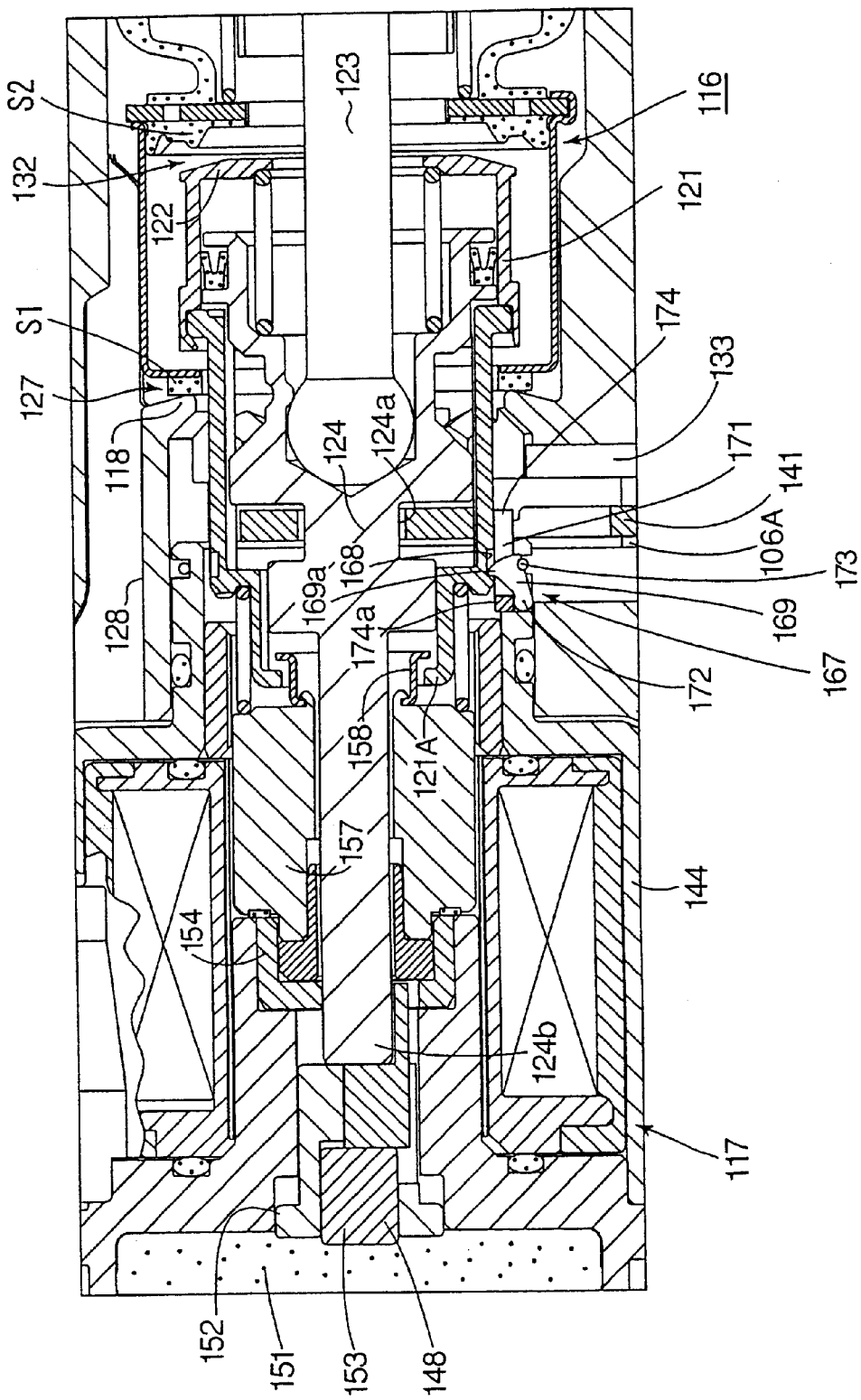
FIG. 11 is a cross section illustrating another phase of operation of the essential part shown in FIG. 8.

When the brake pedal is depressed and the tandem brake booster 101 is actuated, the fold 174a of the operating member 174 is spaced from the pawl 169a, and the atmosphere valve 132 is maintained open with an increased valve opening (FIG. 11).

While in the operative condition, if the valve plunger 124 retracts slightly, the resilience of the spring 173 prevents the pawl 169a from being disengaged from the recess 168.

If the brake pedal is now released, the input shaft 123 and the valve plunger 124 retract rearward, and hence the front end face of the engaging portion 124a of the valve plunger 124 abuts against the key member 141, and the key member 141 and the operating member 174 retract rearward relative to the valve body 106 and the engaging member 169. Concomitantly, the fold 174a of the operating member 174 pushes the engaging member 169 outward (or downward as viewed in the drawing) against the resilience of the spring 173, whereby the pawl 169a is disengaged from the recess 168 in the tubular member 121 to terminate the connection between the valve body 106 and the tubular member 121 (FIG. 12). Accordingly, the components of the tandem brake booster 101 return to their inoperative positions shown in FIGS. 8 and 9.

Operation as an Automatic Brake

When it is desired to operate the tandem brake booster 101 of the second embodiment as an automatic brake, a controller is used to energize the solenoid 117 under the inoperative condition shown in FIG. 8, without depressing the brake pedal.

In response thereto, the piston 157 is moved forward with respect to the hosing 142, and at the same time, the tubular member 121 is gently driven forward relative to the valve body 106 and the valve plunger 124.

This causes the first seat S1 of the valve element 126 to be seated upon the vacuum valve seat 118 to close the vacuum valve 127 and causes the atmosphere valve seat 122 to move away from the first seat S2 of the valve element 126 to open the atmosphere valve 132. Accordingly, the atmosphere is introduced into the both variable pressure chambers B and D, and the both power pistons 111 and 112 and the valve body 106 and the like are driven forward. The tubular member 121 is gently driven forward, but the rear end face of the engaging portion 124a of the valve plunger 124 does not abut against the key member 141. Accordingly, the pawl 169a of the engaging member 169 cannot engage the recess 168 in the tubular member 121. Thus, the engaging means 167 is prevented from functioning. This covers the operation of the tandem brake booster 101 when it functions as an automatic brake.

At the commencement of operation of the automatic brake, the axial member 153 abuts against the reaction disc 151, as it is pushed in interlocked relationship with the piston 157, but because the axial member 153 is spaced from the front end face of the valve plunger 124, a brake reaction which is acting on the output shaft 155 is not transmitted through the valve plunger 124 and the input shaft 123. Subsequently, as the brake reaction which is acting upon the output shaft 155 increases, the reaction disc 151 bulges rearward to push back the axial member 153 rearward.

When the solenoid 117 ceases to be energized while the brake booster is operating as the automatic brake, the spring 166 drives the tubular member 121 and the piston 157 rearward relative to the valve plunger 124, whereby the atmosphere valve 132 is closed while the vacuum valve 127 is opened. Accordingly, the valve body 106 and the like return to their inoperative positions shown in FIG. 9.

The second embodiment constructed in the manner mentioned above is capable of achieving a similar functioning and effect as achieved by the first embodiment described previously.

In the second embodiment, the engaging member 169 is swingably mounted in the notch 144b of the yoke 144 by the pin 172, but the engaging member 169 may be swingably mounted in the inner periphery of the valve body 6 by the pin 172. Alternatively, the disposition of the engaging member 169 and the recess 168 in the second recess 168 may be reversed. Thus, the yoke 144 may be formed with the recess 168 while the engaging member 169 may be mounted on the tubular member 121.

The above embodiments have been described as an application of the present invention to the tandem brake booster 1 or 101, but its should be understood that the invention is equally applicable to a tandem brake booster of single type having a pair of a constant and a variable pressure chamber or a tandem brake booster of triple type having three pairs of constant and variable pressure chambers.

While the invention has been described above in connection with preferred embodiments thereof, it should be understood that a number of changes, modifications and substitutions therein are possible from the above disclosure without departing from the spirit and the scope of the invention defined by the appended claims.

What is claimed is:

1. A brake booster including a valve body slidably disposed within a shell, a power piston mounted on the valve body, a constant pressure chamber defined forwardly of the power piston within the shell, a variable pressure chamber defined rearwardly of the power piston within the shell, and a valve mechanism for controlling a switching of supply/discharge of a fluid to and from the variable pressure chamber, the valve mechanism including a vacuum valve seat formed on the valve body, a tubular member disposed to be axially movable within the valve body and having an atmosphere valve seat formed toward the rear end thereof, a valve element having a first seat which is adapted to be seated upon the vacuum valve seat and a second seat adapted to be seated upon the atmosphere valve seat, and a valve plunger mechanically coupled to an input shaft and disposed to be axially movable relative to the valve body and adapted to be driven forward together with the tubular member as at least the input shaft is driven forward;

the brake booster comprising engaging means for connecting the tubular member and the valve body together when the input shaft is driven forward through a given stroke relative to the valve body to maintain the second seat of the valve element removed from the atmosphere valve seat during the time the input shaft is being driven forward, the engaging means terminating the connection between the tubular member and the valve body as the input shaft retracts to its inoperative position.

2. A booster according to claim 1 in which the engaging means comprises a recess formed in either the inner peripheral surface of the valve body or the outer peripheral surface of the tubular member, and a convex resilient member formed on the other, the valve body and the tubular member being connected together when the convex resilient member is engaged with the recess, the arrangement being such that as the input shaft retracts to its inoperative position, the valve plunger abuts against the tubular member to disengage the convex resilient member from the recess, thereby terminating the connection between the valve body and the tubular member.

3. A brake booster according to claim 1 in which the engaging means comprises a recess formed in either the inner periphery of the valve body or the outer periphery of the tubular member, an engaging member provided on the other and engageable with the recess, a resilient member for urging the engaging member in a direction to engage the recess, and drive means for causing the engaging member to engage with or disengage from the recess in response to the movement of the input shaft, the arrangement being such that as the input shaft is driven forward through a given stroke from its inoperative position, the drive means causes the engaging member to engage the recess to connect the tubular member and the valve body together and as the input shaft retracts to its inoperative position, the drive means causes the engaging member to be disengaged from the recess to terminate the connection between the tubular member and the valve body.

4. A brake booster according to claim 3 in which the engaging member is mounted so as to be swingable about a fulcrum provided on either the inner periphery of the valve body or the outer periphery of the tubular member, the engaging member including a pawl which is adapted to be engaged with or disengaged from the recess, the drive means being operative when the input shaft is driven forward through a stroke less than the given stroke to disengage the pawl of the engaging member from the recess against the resilience of the resilient member and operative as the input shaft is driven forward through a stroke which is equal to or greater than the given stroke to permit a radial movement of the engaging member to cause the pawl thereof to be engaged with the recess.

5. A brake booster according to claim 1, further comprising a solenoid disposed within the valve body, the arrangement being such that when the solenoid is energized, the tubular member moves relative to the valve body to operate the valve mechanism.

* * * * *